(12) United States Patent
Gottipaati et al.

(10) Patent No.: US 12,106,108 B1
(45) Date of Patent: Oct. 1, 2024

(54) SYSTEMS AND METHODS FOR CREATING DETERMINATIONS SYSTEMS

(71) Applicant: Morgan Stanley Services Group Inc., New York, NY (US)

(72) Inventors: Mahendra Gottipaati, Isleworth (GB); Deepak Jairath, Maharashtra (IN); Atul Arvind Shivtare, Maharashtra (IN); Gaurav Pavankumar Lakhotia, Thane (IN); Vijay Kumar Rajendran, TamilNadu (IN); Priyesh Surana, Madhya Pradesh (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/623,567

(22) Filed: Apr. 1, 2024

(30) Foreign Application Priority Data

May 31, 2023 (IN) .............................. 202311037522

(51) Int. Cl.
*G06F 9/30* (2018.01)
*G06F 8/41* (2018.01)

(52) U.S. Cl.
CPC .......... *G06F 9/30145* (2013.01); *G06F 8/427* (2013.01)

(58) Field of Classification Search
CPC ............................ G06F 9/30145; G06F 8/427
See application file for complete search history.

(56) References Cited

U.S. PATENT DOCUMENTS

2016/0202980 A1* 7/2016 Henry ................. G06F 9/30101
  712/213
2021/0042124 A1* 2/2021 Piry .................... G06F 9/30181

* cited by examiner

*Primary Examiner* — Michael J Metzger
(74) *Attorney, Agent, or Firm* — PEARL COHEN ZEDEK LATZER BARATZ LLP

(57) ABSTRACT

A system and method for modifying a system's execution logic without changing the code. The system and method can involve receiving a request for execution, fetching an instruction set that corresponds to the request, parsing the instruction set, extracting metadata from the request, loading data for the instruction set based on the request, and executing each instruction based on the loaded data.

16 Claims, 9 Drawing Sheets

FIG. 7

SYSTEMS AND METHODS FOR CREATING DETERMINATIONS SYSTEMS

CROSS REFERENCE TO RELATED APPLICATIONS

This application claims the benefit of and priority to Indian Provisional Patent Application No. 202311037522 filed on May 31, 2023, incorporated herein by reference in its entirety.

FIELD OF THE INVENTION

The invention relates generally to complex systems for making determinations that can accommodate multiple entities and/or users. In particular, to changing decision logic in complex systems without recoding.

BACKGROUND

Many systems can make periodic and/or real-time determinations that can require many complex computations that often require a computer programmer to code a computer to make the determinations. Additionally, each client/company's requirements can be dynamic such that their determinations change over time.

Changing market conditions calculation logic to change, adding previously unknown scenarios that are now known can cause the addition of logic, offering additional services can cause amendments to computations, and/or improvements to the logic (e.g., improvements to business strategy and/or more efficient computations) can cause amendments to the logic. Each logic change can cause recoding for its respective determination.

In some scenarios it can be impossible and/or impractical to recode each time determination methods need to be updated. For example, availability of coders may be limited and/or the time it takes to recode may be longer than the time between determination changes (e.g., determinations that change with changing market prices).

For example, hedge fund accounting calculations are typically not standard across all the funds that typically perform bespoke calculations. A typical accounting software may have these accounting requirements as code and changing the system as per every fund's requirement can be very difficult if not impossible when it comes to servicing a large number of funds. It can also become difficult to keep the bespoke requirements from impacting other funds who may not be interested in the same approach as the other fund.

Bespoke changing requirements can often result in users (e.g., an operation team) resorting to unreliable methods instead of waiting for coding changes, to meet the changing requirements. For example, users may perform specific custom calculations outside their determination software systems (e.g., in excel spreadsheets) to provide answers to clients in a shorter time period than recoding takes. Performing specific customer calculations outside of the determination software system can also require that the user maintain constant updates of the calculations, error check the calculations, and/or keep track of which updates have been made. However, performing/maintaining/keeping up with specific custom calculations outside of the determination software system can cause errors, can require many hours of additional work, and/or can cause the main software system to be erroneous. Further, as the determination software system grows (e.g., additional clients with specific requirements are added), performing specific customer calculations outside of the main software system is typically not scalable. Thus, client specific changing logic can make determinations systems difficult to maintain and support.

Therefore, it can be desirable to allow a change in logic of determinations/calculations (e.g., an update to the code) in determination systems, without requiring a coder to program code, and/or having to recode every change.

SUMMARY OF THE INVENTION

One advantage of the invention can include modifying a system's execution logic without changing the code. Another advantage can include allowing modification in a manner that is close to plain English, easy to understand, using non-changing inputs that can allow for writing any logic that is needed.

Another advantage of the invention can include allowing any datapoint within the data to perform aggregation, allowing computations to be performed on any level as specified by the user. Users can use data with various data types of relationships between them, one to many, many to one, one to one and many to many. Another advantage of the invention is that it can support custom functions. This can allow encapsulation of complex logic within these functions so that it does may not need to be recoded by everyone. Another advantage of the invention is that the user can define variables which can be used in subsequent calculations, which can provide transparency on the calculations step by step.

Another advantage of the invention can include integration into other services.

In one aspect, the invention involves a method for modifying a system's execution logic without changing the code. The method involves receiving, by an instruction execution service of the system, a request for execution comprising an entity identifier, an application type, a group, and active date. The method involves fetching, by an instruction provider module of the system, an instruction set that corresponds to the request, wherein each instruction in the instruction set comprises a sequence indicator that specifies execution order within the instruction set, reference data category, a variable name, an aggregation level, a filter to select inputs from reference data based on category, a calculation logic, and an indicator as to whether the instruction is a result yielding instruction, or any combination thereof. The method involves parsing, by the instruction parser modules of the system, each instruction in the instruction set based on instruction language grammar. The method involves validating, by the instruction parser modules of the system, each parsed instruction in the instruction set based on language grammar. The method involves adding, by the instruction parser modules of the system, to each parsed instruction in the instruction set an indicator as to whether the instruction is simple or complex. The method involves extracting, by a metadata generator of the system, metadata from each instruction in the instruction set, wherein the metadata includes information regarding data that is required from third party providers to execute the instruction set. The method involves loading, by one or more data provider modules of the system, the data that is required from third party providers based on the metadata and the reference data category of each instruction in the instruction set into a context holder module. The method involves executing, by an instruction execution engine, each instruction's calculation logic in the instruction set based on data received by the context holder module in the order specified within the instruction set. The method involves outputting, by an execution result generator of the system, a resultant of the instruction that indicates it is the result yielding instruction.

In some embodiments, the instruction execution engine does not retrieve data from any entity. In some embodiments, if the instruction is complex, executing the particular instruction's calculation logic further comprises retrieving one or more functions from a function repository corresponding to the calculation logic.

In some embodiments, the one or more data provider modules are an account reference data provider, an order reference data provider, a balance provider or any combination thereof.

In some embodiments, the entity identifier is the identity of the entity requiring execution of the instruction. In some embodiments, the method involves executing an instruction involves filtering the input data, evaluating the calculation logic, aggregating results and storing them back in the Context holder. In some embodiments, executing an instruction involves resolving one or more values. In some embodiments, a complex instruction includes a function.

In another aspect, the invention involves a non-transitory computer readable storage medium storing a set of instructions for modifying a system's execution logic without changing the code, by performing the operations of receiving a request for execution comprising an entity identifier, an application type, a group, and active date. The operations of fetching an instruction set that corresponds to the request, wherein each instruction in the instruction set comprises a sequence indicator that specifies execution order within the instruction set, reference data category, a variable name, an aggregation level, a filter to select inputs from reference data based on category, a calculation logic, and an indicator as to whether the instruction is a result yielding instruction, or any combination thereof are also performed.

The operations of parsing each instruction in the instruction set based on instruction language grammar, validating each parsed instruction in the instruction set based on language grammar, and adding to each parsed instruction in the instruction set an indicator as to whether the instruction is simple or complex are also performed.

The operations of extracting metadata from each instruction in the instruction set, wherein the metadata includes information regarding data that is required from third party providers to execute the instruction set are also performed.

The operations of loading the data that is required from third party providers based on the metadata and the reference data category of each instruction in the instruction set into a context holder module, executing each instruction's calculation logic in the instruction set based on data received by the context holder module in the order specified within the instruction set, and outputting a resultant of the instruction that indicates it is the result yielding instruction are also performed.

In some embodiments, the instruction execution engine does not retrieve data from any entity. In some embodiments, if the instruction is complex, executing the particular instruction's calculation logic further comprises retrieving one or more functions from a function repository corresponding to the calculation logic.

In some embodiments, the one or more data provider modules are an account reference data provider, an order reference data provider, a balance provider or any combination thereof. In some embodiments, the entity identifier is the identity of the entity requiring execution of the instruction.

In some embodiments, executing an instruction involves filtering the input data, evaluating the calculation logic, aggregating results and storing them back in the Context holder. In some embodiments, executing an instruction involves resolving one or more value. In some embodiments, a complex instruction includes a function.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 7 shows an example of a user interface, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

Figure 1:
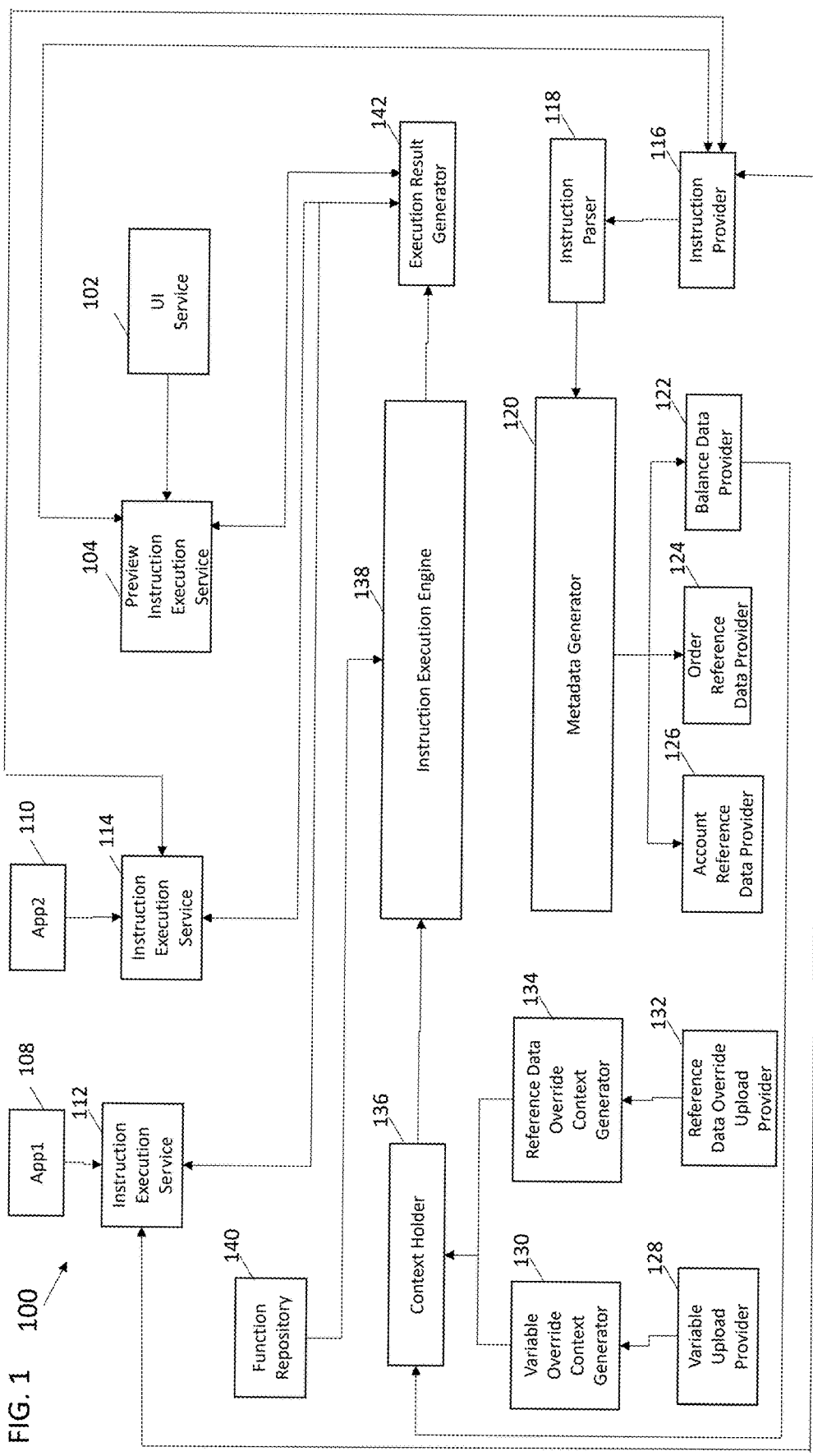
FIG. 1 is a diagram of a system architecture for modifying a system's execution logic, according to some embodiments of the invention.

FIG. 1 is a diagram of a system architecture 100 for modifying a system's execution logic, according to some embodiments of the invention.

Figure 7:
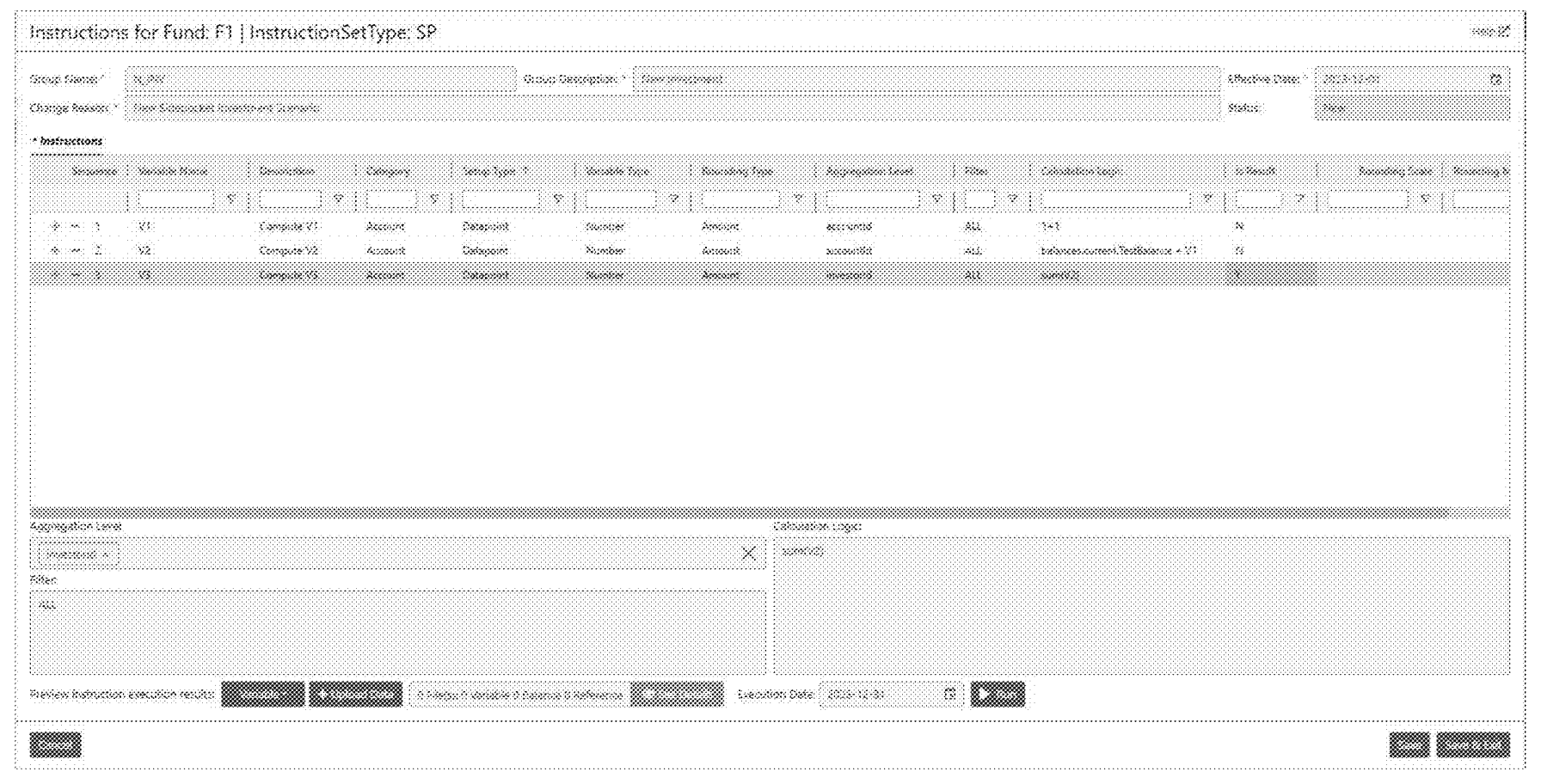

The system architecture 100 can include a user interface (UI) service 102 and a preview instruction execution service 104. The UI service 102 can transmit a UI to a display (e.g., for a user to input instructions). The UI can appear as shown in FIG. 7. Turning to FIG. 7, FIG. 7 shows an example of a UI, according to some embodiments of the invention. Turning back to FIG. 1, the UI service 102 can receive user input through the UI interface and one or more instructions can be created. The inputs can be viewed as a language and/or protocol. For example, for a fund accounting system, the inputs can be viewed as a fund accounting language.

The inputs can be based on the particular determination system and/or the type of determinations that are made. For example, for a fund accounting system, the input (e.g., instruction definition) can be as follows, in Table 1:

TABLE 1

| Instruction variable | Description |
| --- | --- |
| Entity Id | Identifier for an entity (e.g., client, fund, advisor, portfolio, school) for which the instructions are being written. |
| Type | This is a unique type within each Entity to categorize a set of instructions. The set of instructions can be the logical processing to be performed. For example, for a hedge fund, the type can be a sidepocket, management fee, incentive fee and/or income allocation, for a school the type can be fees computation, administration fee computation and/or staff salary computation. |
| Group | This is a unique group within the Type to cater to multiple scenarios. For example, Sidepockets instructions can be different for different types of Sidepocket activities. For example, for a Sidepocket Instruction Type, there can be various groups having instructions according to scenario such as New Investment, Liquidation or Addon Investment. In another example, for a school, fees can be the type and first standard, second standard and third standard can be the groups to have different instructions. |
| Effective Date | Date the instruction set is active. |
| Sequence | Order for the instructions in each group to execute. |
| Category | This is the category of the data (e.g., reference data source) on which the instruction execution can occur on. For example, if the Category is Account then the computations can be performed on Accounts data and all the properties of Account Reference data can be accessible for the computations. In another example, if the Category is Order then the computations can be performed on Orders data and all properties of Orders can be available for the computation. |

TABLE 1-continued

| Instruction variable | Description |
| --- | --- |
| Filter | Filter the entities under selected categories by writing filter expressions using Logical (and/or), Conditional (equal to or not equal to), Relational (greater than or less than) and Arithmetic (addition/subtraction) operators. Filtering the entities can include filtering accounts or orders. For example, if there are 10 accounts, filter logic can be applied to 10 accounts. For Example: A filter having an expression investorId = 'Investor1' and role in ('role1', 'role2') under Account category results in Accounts belonging to Investor1 having role as either role1 or role2. |
| Aggregation Level | This contains one or more attributes at which the filter entries can be grouped for execution and/or stored. The one or more attributes can be the reference data (e.g., input data) or any variables prior to this instruction under the mentioned category. For Example: if the Aggregation level is investorId then the results of the computation can be expected for each distinct investorId in the computation. |
| Calculation Logic | Logic that may be executed for either each entity (e.g., each account) or the group of entities (e.g., group as created by the aggregation level) returned by the filter based on the aggregation level. For example, if the Aggregation Level is account, and Filter returns all accounts and Calculation Logic is 1 + 1, then for every account returned by the Filter, 1 + 1 can be executed and resultant can be stored against each accountId. |
| Variable Name: | Result of the execution of the calculation logic can be stored against the variable name defined here, at the level of aggregation. Store variable name, entity ID, result value. |
| Is Result | A flag that indicates whether the instruction is to be given back to the caller, e.g., provides the resultant of the determination (e.g., is the final instruction) or whether the instruction is returned as an output of the whole execution. For Example: Management Fee instructions can expect Crystallized and Accrued Management Fee charges to be computed. However, to get to them, there can be many complex instructions before them to compute the Management Asset and Rate for charging these fees. The caller system can be only interested in the final fees and not the intermediate computations hence this flag helps to select the fields that can be returned back to caller after execution completion. |
| Setup Type | This can indicate whether the variable is uploaded, constant, or a normal datapoint. By default, every variable can assume a normal datapoint, if not specified. Uploaded variables can indicate that the variable value is expected to be uploaded by the User. Constant can indicate that the variable cannot be assigned with another value during the execution. |

TABLE 1-continued

| Instruction variable | Description |
|---|---|
| | Normal variables can indicate a variable to be computed during the execution. |
| Variable Type | This indicates a type of the Variable. The variable can be a Number, Text or Date type. In some embodiments, by Default, the Variable Type is Number, if not specified. The variable type can indicate whether to treat the value of the variable as Number or Text or Date so that Logical, Conditional, Relational and Arithmetic operations can be performed consistently. |
| Rounding Type | A variable can have one of amount, ratio or a custom rounding type. Amount can be configured with a rounding precision as 2 and a rounding a strategy as round up. Ratio is configured with Rounding precision as 12 and Rounding Strategy as Round Up. When User selects Custom as a type, then Precision and Strategy can be configured manually under Rounding Precision and Rounding Strategy. Rounding precision is the integer value representing no. of digits to have after the decimal point in a Number Rounding Strategy is a text value indicating the strategy to fit the digits after decimal point under the configured Rounding precision. This is useful when the Number is computed with Higher precision and can be rounded off to a lower precision. Rounding Type is mandatory and can be applied for Variables with Number as Variable Type. For Example: If the rounding type is Amount and the result of the computation is 100.42756 then it can be rounded at the end to two decimal places with a round up strategy such that in this example the final result can be 100.43. |

Table 2 shows an example of an instruction for Entity F1.

TABLE 2

| Entity Id | Type | Group | Effective Date | Sequence | Category | Variable Name | Aggregation Level | Filter | Calculation Logic | Is Result |
|---|---|---|---|---|---|---|---|---|---|---|
| F1 | SP | N_INV | 2024 Jan. 31 | 1 | Account | V1 | account Id | ALL | 1 + 1 | N |
| | | | | 2 | Account | V2 | account Id | ALL | balances.current. TestBalance + V1 | N |
| | | | | 3 | Account | V3 | investor Id | ALL | sum(V2) | Y |

As shown in Table 2, for Entity Id=F1, Type=Side Pocket (SP), Group=N_INV (new investment), Effective Date, Jan. 31, 2024, there are three instructions, executed in the sequence=1, 2, 3. In this example, the first instruction in the sequence computes values for variable V1. The category=account which can indicate that the reference data for the first instruction is a list of accounts for this client. Each account can have unique account identifier. In another example, the category=order, which can indicate that there is a list of orders, the list of orders can include a unique identifier for each order.

The filter is set to all which can indicate that the instruction is executed on all account. In a different example, the filter can be set to operate on subset of accounts. For example, the filter can be set as investorId='Investor1' and role in ('role1', 'role2'), which can indicate that only Accounts belonging to Investor1 having role as either role1 or role2 can be selected for the computation.

The aggregation level is account ID (e.g., account identifier), which can indicate that the results of the computation are expected for each account returned by the Filter. In another example, the Aggregation can be fundId and calculation logic can be sum(V1) which can indicate that the result of the computation is expected for each FundId with sum of value of V1 from Accounts under respective Fund.

The isresult field is set to N, which can indicate that V1 is not the resultant of the instruction set.

The value of V1 can be determined by executing the calculation logic for V1, which for the first instruction in the sequence is 1+1, or 2. Thus, in this example, V1=2.

Assume that there are three accounts, Account 1, Account 2, and Account 3, then after execution of the first instructions, the result can be as shown below in Table 3:

TABLE 3

| Entity Id | Variable Name | Variable Value |
|---|---|---|
| Account1 | V1 | 2 |
| Account2 | V1 | 2 |
| Account3 | V1 | 2 |

The second instructions, V2 has category=account, filter=all, aggregation level=account ID, is result=N, and the calculation logic=balances.current.TestBalance+V1. In this example, the calculation logic is an expression that is input by the user (e.g., selected from a drop down menu of available expressions) to access account balances. The account balances can be accessed at various points in time and/or at various levels (e.g., amount of account balances). The term "balances" indicates that account balances are to be used. The term "current" indicates that it is the current account balance. The term "TestBalance" indicates that the name of the Balance. For example, an Account may have Gross Balance, Net Balance or Income etc. In various embodiments, the terms "previous," "monthBeginning," "quarterBeginning," "previousQuarterBeginning," and/or "previousQuarterEnding" refers to the balance period.

Assume in this example, the value of TestBalance in the current period for Account 1, Account 2, and Account 3 is 10, 20 and 30, respectively. In this example, after execution of the second instruction, the result can be as shown below in Table 4:

TABLE 4

| Entity Id | Variable Name | Variable Value |
|---|---|---|
| Account1 | V1 | 2 |
| | V2 | 12 |

TABLE 4-continued

| Entity Id | Variable Name | Variable Value |
|---|---|---|
| Account2 | V1 | 2 |
|  | V2 | 22 |
| Account3 | V1 | 2 |
|  | V2 | 32 |

The third instruction, V3 has category=account, aggregation level=investor ID, filter all, isresult=Y, and calculation logic=sum(V2). In this example, with aggregation level investor ID, the investors ID is considered when executing the instructions. Assume that Account1 belongs to Investor1, and Account2 and Account3 belongs to Investor2. In this example, the calculation logic can be executed for each group where accounts under that group can be passed to the sum function. In this example, after execution of the third instructions, the result can be as show below in Table 5:

TABLE 5

| Entity Id | Variable Name | Variable Value |
|---|---|---|
| Account1 | V1 | 2 |
|  | V2 | 12 |
| Account2 | V1 | 2 |
|  | V2 | 22 |
| Account3 | V1 | 2 |
|  | V2 | 32 |
| Investor1 | V3 | 12 |
| Investor2 | V3 | 54 |

Table 6 is an example of Reference Data and Table 7 is an example of instructions, to be used as an example with the Reference data of Table 6, according to some embodiments of the invention.

TABLE 6

Reference Data

| Account | InvestorId | Fund | TestBalance | Role |
|---|---|---|---|---|
| Account1 | Investor1 | F1 | 10 | role1 |
| Account2 | Investor1 | F1 | 20 | role1 |
| Account3 | Investor2 | F1 | 30 | role2 |
| Account4 | Investor2 | F2 | 40 | role2 |
| Account5 | Investor2 | F2 | 50 | role2 |
| Account6 | Investor3 | F2 | 60 | role3 |

TABLE 7

| variableName | AggregationLevel | Filter | calculationLogic |
|---|---|---|---|
| V1 | investorId | ALL | sum(balances.current.TestBalance) |
| V2 | fundId | ALL | sum(balances.current.TestBalance) |
| V3 | investorId | ALL | if(role = 'role1', 'A', 'B') |
| V4 | V3 | ALL | sum(balances.current.TestBalance) |
| V5 | accountId | ALL | balances.current.TestBalance |
| V6 | accountId | investorId = 'investor2' and fundId = 'F2' | balances.current.TestBalance |

Table 8 shows the example results of aggregation of inputs, for the aggregation level in the instructions of Table 7 for the reference data of Table 6, according to some embodiments of the invention.

TABLE 8

Aggregation of Inputs

| AggregationKey | List of Entities |
|---|---|
| investor1 | Account1 |
|  | Account2 |
| Investor2 | Account3 |
|  | Account4 |
|  | Account5 |
| Investor3 | Account6 |
| F1 | Account1 |
|  | Account2 |
|  | Account3 |
| F2 | Account4 |
|  | Account5 |
|  | Account6 |

Turning to Table 7, executing V1, groups accounts at the investors level, thus InvestorId is the aggregation level for V1. For the Reference Data in Table 6, Investor 1 has Account 1 and Account 2, Investor 2 has Account 3, Account 4, and Account 5, and Investor 3 has Account 6, as shown in Table 8. Executing V2, groups accounts at the fund id level, thus fundId is the aggregation level for V2. F1 has Account 1, Account 2, and Account 3, and F2 has Account 4, Account 5, and Account 6. V3 is the aggregation level for V4, and for V3 the calculation logic is also the role1, 'A', 'B' is an if else condition, which is why in this example role 2 and role 3 are B.

Table 9 below shows an example of results of executing the logic of Table 7 with the reference data of Table 6, according to some embodiments of the invention.

TABLE 9

Result Context

| entityId | variableName | variableValue |
|---|---|---|
| investor1 | V1 | 30 |
| investor2 | V1 | 120 |
| investor3 | V1 | 60 |
| F1 | V2 | 60 |
| F2 | V2 | 150 |
| investor1 | V3 | A |
| investor2 | V3 | B |
| investor3 | V3 | B |
| A | V4 | 30 |
| B | V4 | 180 |
| Account1 | V5 | 10 |
| Account2 | V5 | 20 |
| Account3 | V5 | 30 |
| Account4 | V5 | 40 |
| Account5 | V5 | 50 |
| Account6 | V5 | 60 |
| Account4 | V6 | 40 |
| Account5 | V6 | 50 |

As shown in Table 9, for investor 1, for variable V1, the aggregation level is InvestorId, thus the calculation logic is applied by aggregating by InvestorId. For V1, investor 1, the value is 30 (sum of 10 and 20), for investor 2, for variable V1 the value is 120 (sum of 30, 40 and 50), for investor 3, for variable V1 the value is 60 (no sum necessary as there is only one value for investor3).

For variable V2, the aggregation level is fundId, thus the calculation logic is applied by aggregating by fundId. For F1, variable V2, the value is 60 (sum of 10, 20, 30), for F2, variable V2 the value is 150 (sum of 40, 50 and 60).

For variable V3, the aggregation level is InvestorId, thus the calculation logic is applied by aggregating by InvestorId.

For investor 1, the value is A (role is role 1, thus value is A), for V3, for investor 2, the value is B (role is role 2, thus value is B). V3, for investor 3, the value is B (role is role 2, thus value is B).

For variable V4, the aggregation level is V3, thus the calculation logic is applied by aggregating by V3 results, A and B. For V4, A, the value is 30 (sum of role 1, 10 and 20), for V4, B, the value is 180 (sum of role 2 and role 3, 30, 40, 50, and 60).

For variable V5, the aggregation level is account id, thus the calculation logic is applied by aggregating by accountId. For V5, Account 1, the value is 10, for V5, Account 2, the value is 20, for V5, Account 3, the value is 30, for V5, Account 4, the value is 40, for V5, Account 5, the value is 50 and for V5, Account 6, the value is 60.

For variable V6, the aggregation level is account id, with a filter for investorid='investor2' and fundId='F2'. Only Account 4, and Account 5 meets the filter criteria, thus only Account 4 and Account 5 are determined for V6. For V6, Account 4, the value is 40, and for V6, Account 5, the value is 50.

In some embodiments, an instruction group can be named. For example, turning to FIG. 7, shows an example of a user interface that can be displayed for naming an instruction group. For example, as shown in FIG. 7, the sequence, category, variable name, aggregation level, filter, calculation logic, is result, setup type, variable type and/or routing type can be input for each instruction.

Turning back to FIG. 1, the Entity Id, Type, Group and/or Effective Date can form a unique key to be used to store and/or fetch the instruction. In some embodiments, the instructions in a particular instruction set can be deactivated and new instructions for the set can be activated. In some embodiments, each time a unique Entity ID, Type, Group and/or Effective Date are created, a new instruction set is created.

In some embodiments, instructions sets can be versioned. For example, assume Fund F1 has instructions for a management fee determination under a first logic effective on Jan. 31, 2022. Assume that the management fee instructions change effective Jan. 31, 2023. The entries can appear as shown below in Table 10:

TABLE 10

| instructionSetId | entity Id | instructionSetType | instructionSetGroup | effectiveDate | isActive | version |
|---|---|---|---|---|---|---|
| uniqueId1 | F1 | Mfee | Default | 2022 Jan. 31 | 1 | 1 |
| uniqueId2 | F1 | Mfee | Default | 2023 Jan. 31 | 1 | 1 |

As is apparent to one of ordinary skill in the art Tables 6, 7, 8 and 9 are illustrative of one example, and that other Reference Data, and instructions can be used.

In various embodiments, additional inputs can include Setup Type which can specify variable characteristic. For Example: whether the variable is an Uploaded variable where user is expected to provide value or a Constant where the variable cannot be assigned another value during the execution or a Normal variable for storing results of computations. In various embodiments, additional inputs can include Variable Type, which specifies whether the variable is number, letter, word, or combination thereof, and/or Rounding Type, which specifies for a floating number a decimal place to round up or down too. Setup Type can include finite values of uploaded, constant and/or normal datapoint. Variable Type can include finite values of number, text and date. Rounding Type can include finite values of amount, ratio and custom.

In various embodiments, Setup Type, Variable Type and/or Rounding Type are set as default values.

Instructions can be input by a user, loaded from a file, and/or received from another computer device.

Assume that a further change to the management fee instruction set active Jan. 31, 2023 is later desired. The first version of the Jan. 31, 2023 instruction set can be deactivated, and a new version for the management fee instruction set for the Jan. 31, 2023 can be activated, as shown below in Table 11:

TABLE 11

| instructionSetId | entity Id | instructionSetType | instructionSetGroup | effectiveDate | isActive | version |
|---|---|---|---|---|---|---|
| uniqueId1 | F1 | Mfee | Default | 2022 Jan. 31 | 1 | 1 |
| uniqueId2 | F1 | Mfee | Default | 2023 Jan. 31 | 0 | 1 |
| uniqueId3 | F1 | Mfee | Default | 2023 Jan. 31 | 1 | 2 |

As is apparent to one of ordinary skill in the art, the instruction set type and/or calculation logic can be entity specific. For example, for an entity in a financial context the instruction set type, instruction set group and/or calculation logic can be related to the particular financial context. For an entity in an educational context, the instruction set type, instruction set group and/or calculation logic can be related to the particular educational context.

The UI service 102 can transmit instructions and/or instruct sets to the preview instruction set service 104. The preview instruction set service 104 can allow a user to preview and/or test the instructions and/or instruction sets written. For example, turning to FIG. 7, FIG. 7 shows an example of an interface for which the user tests the instructions input in the UI service 102.

Turning back to FIG. 1, App1 108 and App2 110 are example of applications that are defined in the architecture 100. Each App, App1 108 and App2 110 has a corresponding instruction execution service 112, and 114, respectively. For example, App1 108 can be a side pocket calculator, and App2 110 can be a management fee calculator. The instruction execution service 112 and/or 114 can receive input parameters defined for the instruction set, for example, the four parameters as described above: EntityID, Type, Group and/or Effective Date that can define a unique identifier for an instruction set. In various embodiments, the unique identifier is comprised of other parameters. The unique identifier can be comprised of any input parameters that are input in the instruction set that can create a unique identifier.

The instruction provider 116 can fetch an instruction set that corresponds to received EntityId, Type, Group from the Instruction Repository effective the received Date. As is apparent to one of ordinary skill there can be many more Apps and many more corresponding execution services for varying instructions.

The instruction parser 118 receives the instruction from the instruction provider 116. The instruction parser 118 can parse the instruction to perform a validation of the fields in the instruction. The instruction parser 118 can parse the instruction via a Lexion parser and/or any parser as is known in the art. The instruction parser 118 can validate one or more fields of the instruction. For example, for an instruction that has a filter field as described above, the instruction parser can validate that the filter field includes logical, conditional, relational or arithmetic functions. In some embodiments, the instruction parser 118 validates all of the fields in the instruction. The instruction parser 118 can categorize the instruction as simple or complex. For example, the instruction parser 118 can tag the instruction with a simple or complex tag. A simple instruction can be an instruction where standard arithmetic operations and direct values are in the calculation logic. A complex instruction can be any function expression, for example, sum( ), min( ), avg( ) and/or any function as is known in the art.

The metadata generator 120 can receive the instructions from the instruction parser 118. The metadata generator 120 can extract metadata associated with the instruction. The metadata can be data that is relevant for locating data to execute the instruction. For example, for an instruction that specifies an entity of a fund, the metadata generator 120 can extract the metadata of the particular fund, balance, and/or period.

The balance data provider 122, the order reference data provider 124, and/or the account reference data provider 126 can receive the respective metadata from the metadata generator 120 to pull the respective relevant data.

The account reference data provider 126 can provide account specific data (e.g., Fund, Investor, Roles and Account). The account data can be stored/distributed over multiple entities. The multiple related entities can be configured as a single account entity in flattened model wherein all of these can be denormalized. Data model for Instructions is made agnostic of how the data is actually exists/persisted in the store.

The order reference data provider 124 can provide order specific data. The order data can be stored/distributed over multiple entities, such as Account, TransactionType and Order etc. These multiple related entities can be configured as single Order entity in a flattened model wherein all of these can be denormalized. Data model for Instructions is made agnostic of how the data is actually exists/persisted in the store.

The balance data provider 122 can provide account balances for a period (e.g., the period specified in the instruction). The metadata can include name of the balances, periods for the balances, and/or level for the balances. The balance provider 122 can also include two mapping functions, 1. To get the Balance entity Id, and 2. To get the Balance, having balanceName and the value. The mapping function can be used to extract the entity Id and its associated balance.

For example, assume an instruction containing reference to three balances: 1. balances.current.TestBalance; 2. balances.previous.TestBalance; and 3. balances.current.LIQDBalance, and assume that there are three accounts in the Fund, Account1, Account2, and Account 3. The balance context can be as shown in Table 12 below:

TABLE 12

| Entity Id | Period | Balance Name | Balance Value |
|---|---|---|---|
| Account1 | current | TestBalance | 10 |
|  |  | LIQDBalance | 20 |
|  | previous | TestBalance | 5 |
| Account2 | current | TestBalance | 20 |
|  |  | LIQDBalance | 40 |
|  | previous | TestBalance | 15 |
| Account3 | current | TestBalance | 30 |
|  |  | LIQDBalance | 60 |
|  | previous | TestBalance | 20 |

The variable upload provider 128 can retrieve the data that is user provided. It can be used to get a value for an uploaded variable or override the value of an existing variable. The variable override context generator 130 can populate the override context with the data received from Variable upload Provider 128 which can be used to override the data during computation.

For example, assume the instruction set shown in Table 13 below.

TABLE 13

| Entity Id | Type | Group | Effective Date | Sequence | Category | Variable Name | Aggregation Level | Filter | Calculation Logic | Is Result |
|---|---|---|---|---|---|---|---|---|---|---|
| F1 | SP | N_INV | 2024 Jan. 31 | 1 | Account | V1 | account Id | ALL | 1 + 1 | N |
|  |  |  |  | 2 | Account | V2 | account Id | ALL | balances.current.TestBalance + V1 | N |
|  |  |  |  | 3 | Account | V3 | investor Id | ALL | sum(V2) | Y |

Assume in this example that there are three accounts: Account1, Account2 and Account 3, and the user executes instructions for February month and desires to override the result of V1 with value 5 for Account 2. Table 14 below shows the override data for this example:

TABLE 14

| Instruction Entity Id | Type | Group | Effective Date | Entity Id | Variable Name | Variable Value |
|---|---|---|---|---|---|---|
| F1 | SP | N_INV | 2024 Feb. 29 | Account 2 | V1 | 5 |

During the execution, Variable Upload Provider 128 can provide the data in Table 14 to the variable override context generator 130 which can populate override context as shown in Table 15 below.

TABLE 15

| Entity Id | Variable Name | Variable Value |
|---|---|---|
| Account 2 | V1 | 5 |

Once the instruction V1 is executed, the values for Account1, Account2 and Account 3 can be generated as 2, however Override Context can be consulted before storing the value in the Result Context and it can result in an effective value for V1 against Account 2 to be 5.

The reference data override upload provider 132 can retrieve the User provided data for overriding existing reference data. The reference data override context generator 134 can populate the override context with the data provided by Reference data override upload provider 132. For example, assume the instructions as shown below in Table 16:

TABLE 16

| Entity Id | Type | Group | Effective Date | Sequence | Category | Variable Name | Aggregation Level | Filter | Calculation Logic | Is Result |
|---|---|---|---|---|---|---|---|---|---|---|
| F1 | SP | N_INV | 2024 Jan. 31 | 1 | Account | V1 | account Id | ALL | if(role = 'role1',1 + 1,1 + 2) | N |
| | | | | 2 | Account | V2 | account Id | ALL | balances.current. TestBalance + V1 | N |
| | | | | 3 | Account | V3 | investor Id | ALL | sum(V2) | Y |

Assume in this example, there are three accounts; Account1, Account2 and Account3. Account 1 belongs to role1 and Account 2 and Account 3 belong to role2. The user executes instructions for February month and desires to override the role of Account1 to role2 for scenario testing.

The User can provide the override data as shown below in Table 17:

TABLE 17

| Instruction Entity Id | Type | Group | Effective Date | Sequence | Category | Entity Id | Property Name | Property Value |
|---|---|---|---|---|---|---|---|---|
| F1 | SP | N_INV | 2024 Feb. 29 | 1 | Account | Account 1 | role | role2 |

During the execution, Reference data Override Upload Provider 132 can provide above data to Reference data Override Context generator 134 which can populate override context as shown in Table 18 below.

TABLE 18

| Entity Id | Variable Name | Variable Value |
|---|---|---|
| Account 1 | role | role2 |

During instruction V1 execution, Filter is set to ALL hence all accounts are returned. For each account when the calculation logic is run, the value for role can be found. As the role has been overridden for Account1, overridden value role2 can be used in the comparison and the value of V1 for Account1 can be returned as 3 instead of 2.

The context holder 136 can hold all of the data that has been fetched and/or overwritten, for example, by the balance data provider 122, the order reference data provider 124, the account reference data provider 126, the variable override context generator 130, and/or the reference data override context generator 134.

The instruction execution engine 138 executes the instruction with the data that is provided via the context holder 136. In this manner, the instruction execution engine 138 can reduce latency of instruction execution as the instruction execution engine 138 does not have to fetch any data. In fact, the instruction set itself does not include any instructions to fetch the data. The instruction parser 118, the metadata generator 120 and the data providers 122, 124, 126, 128, 132, 130 and/or 134 can provide the data needed for instructions to execute such that the instructions themselves do not include fetch instructions. The instruction execution engine 138 can use the simple or complex tag added to the instruction to determine whether to execute the instruction in simple or complex manner.

The function repository 140 can be used to store functions that can be used by the instruction execution engine 138 to execute the instructions.

The execution result generator 142 can determine if the instruction executed by the instruction execution engine 138 is the resultant of the instruction set (e.g., by reviewing the "isresult" field in the instruction, or any other field that is used in the instruction to specify that this instruction is the resultant and not an intermediary instruction). For all instructions the result goes into Result Context. At the end of execution, resultant instructions can be checked, and the results can be provided as an output of the execution.

The system architecture 100 can allow for a separation of fetching and/or loading data into the system and executing the calculation logic. In typical system a programmer codes instructions to fetch the data for the model writing. In the system architecture 100, the data that to be fetched is automatically recognized based on the instruction and the functions to execute the instructions are automatically determined. The data providers (e.g., 122, 124, 126, 128 and/or 132) fetch the data based on the metadata extracted from the instruction, and the functions are determined based on the calculation logic.

The system architecture 100 can be for any domain which involves calculations and avoiding recoding. For example, in an education context where the fees calculation depends upon on a standard to be charged under different heads with grants to students with specific criteria. In another example, a salary system, where the salary can be generated with variable payment having many variations in the determination.

Figure 2:
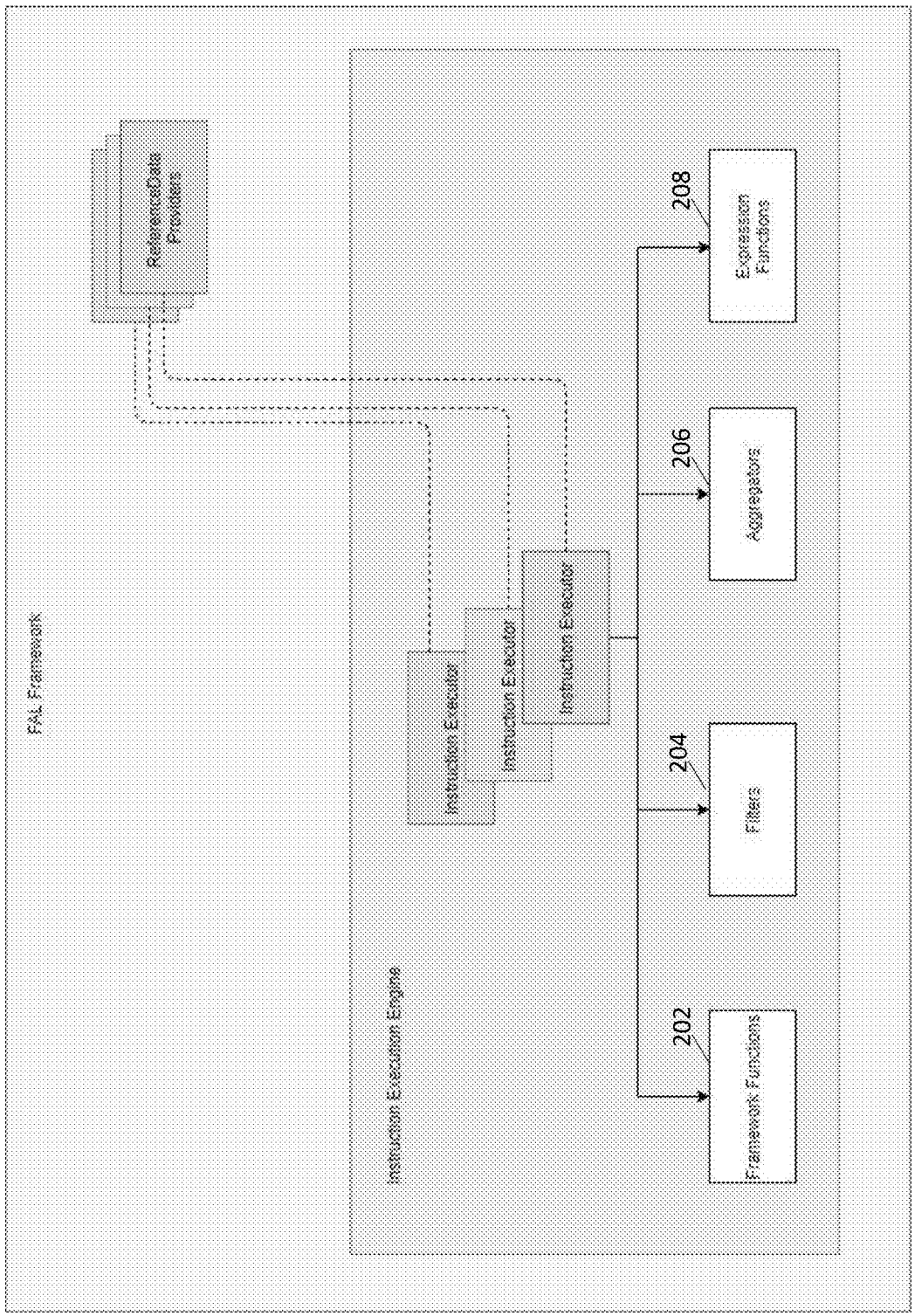
FIG. 2 is an architecture diagram of the instruction execution engine 138 according to some embodiments of the invention.

FIG. 2 is an architecture diagram of the instruction execution engine 138 according to some embodiments of the invention.

The instruction execution engine 138 can include a framework functions 202, filters 204, aggregators 206 and expression functions 208.

The framework functions 202 include functions to facilitate evaluation of simple and/or complex expressions.

The filters 204 can include the various filters to execute the filter instructions. For example, A filter to process ALL as a filter expression, a filter to process predicates having Logical, Conditional, Relational and/or Arithmetic operations.

The aggregators 206 can cause one or more aggregations to occur. Based on the aggregation level, the output of Filter can be aggregated under the aggregation level and each entity in the aggregation level can be submitted in the evaluation with the aggregated entities from Filter under it to evaluate the calculation logic.

The expression functions 208 are functions that can be utilized in expressions under the calculation logic. The expression functions can include allocate, prorate, sum, min, max, power, various date and/or string functions. In some embodiments, additional expression functions can be added. In addition, there can be custom data type functions which can be special functions that can provide a mechanism to accept complex input on the expression functions.

In some embodiments, a transparency report can be generated. The transparency report can include: a. Execution Details as to what parameters were received for the Execution; b. What instructions were used for the execution; c. If the instructions defer with respect to the last execution, then the comparison report of the instruction is included; d. Results from the execution against each Variable Name and Entity, with Entities in Rows and Variable Names in columns; e. What balances have been used; f. What uploaded Variables have been used, if any; g. Execution errors, if any and/or e. Execution warnings, if any.

Figure 3:
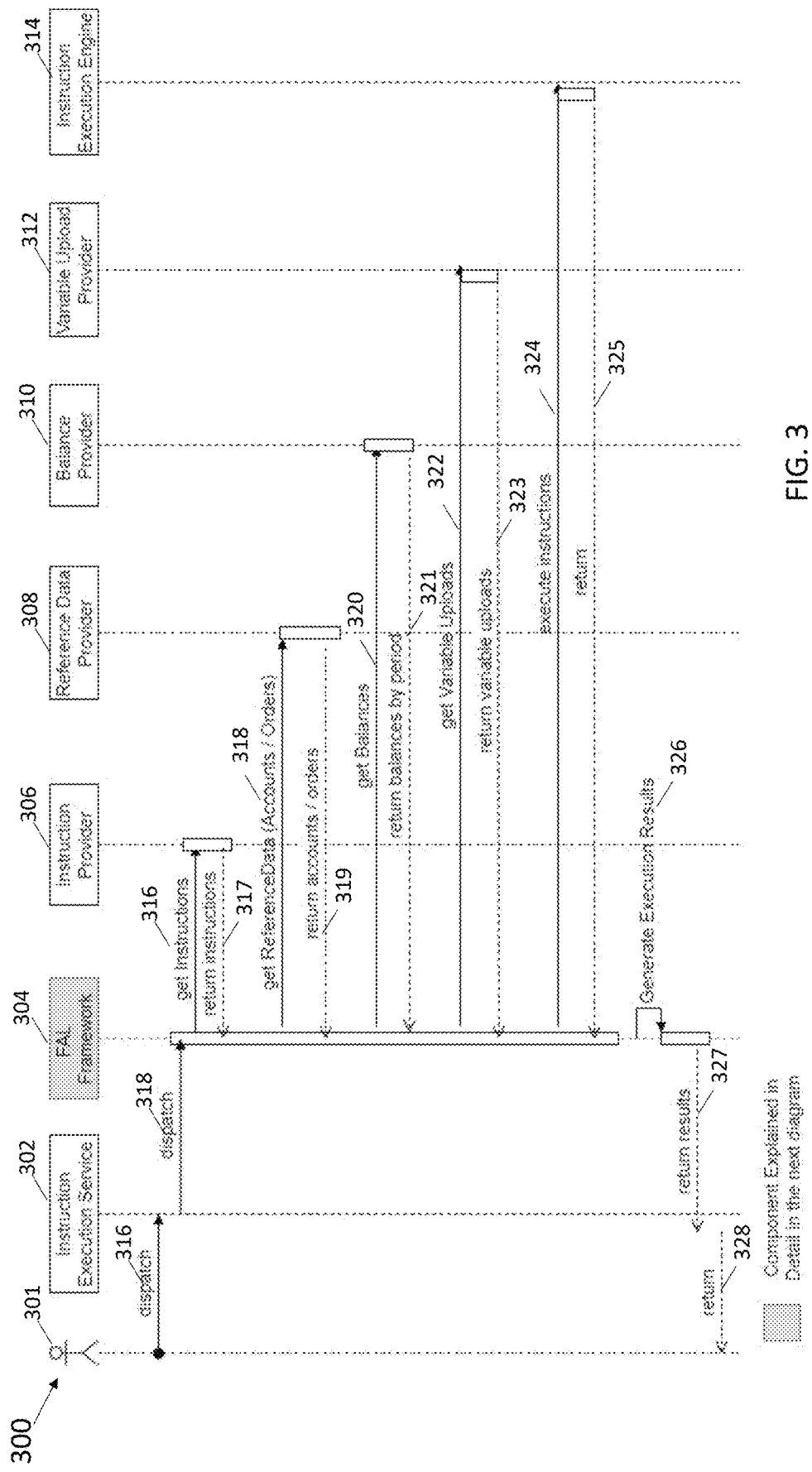
FIG. 3 is a sequence diagram of a method for modifying a system's execution logic, according to some embodiments of the invention.

FIG. 3 is a sequence diagram 300 of a method for modifying a system's execution logic, according to some embodiments of the invention. Specifically, FIG. 3 shows the execution flow from the execution service to FAL framework, back to the user, according to some embodiments of the invention. The user 301 dispatches 316 a request for execution of an instruction. The request can include a unique identifier (e.g., EntityID, Type, Group and/or Effective Date). The dispatched request is transmitted to an instruction execution service 302 (e.g., instruction execution service 112, as described above in FIG. 1). The instruction execution service 302 can forward the dispatch 318 to the Fund Accounting Language (FAL) framework 304 (e.g., the system architecture 100 as described above in FIG. 1). Upon entering the FAL framework 304 unique identifier can be used by the instruction provider 306 (e.g., instruction provider 116, as described above in FIG. 1) to get the instructions 316, and return the instructions 317. The instruction execution engine 314 (e.g., instruction execution engine 138 as described above in FIG. 1) execute instructions 324 and returns results 325. The FAL framework 304 generates the execution results and returns the results 327 to the instruction execution service 302, which returns the results 328 to the user 301.

The reference data provider 308 (e.g., account reference data provider 126 and order reference data provider 124 as described above in FIG. 1) can be used to get the accounts and/or orders 318 and return the accounts and/or order 319. The balance provider 310 (e.g., balance data provider 122 as described above in FIG. 1), can be used to get balances (e.g., by period and/or level) 320 and return balances 321. The variable upload provider 312 (e.g., variable upload provider 128 as described above in FIG. 1) can be used to get variable upload 322 and return the variable uploads 323.

Figure 4:
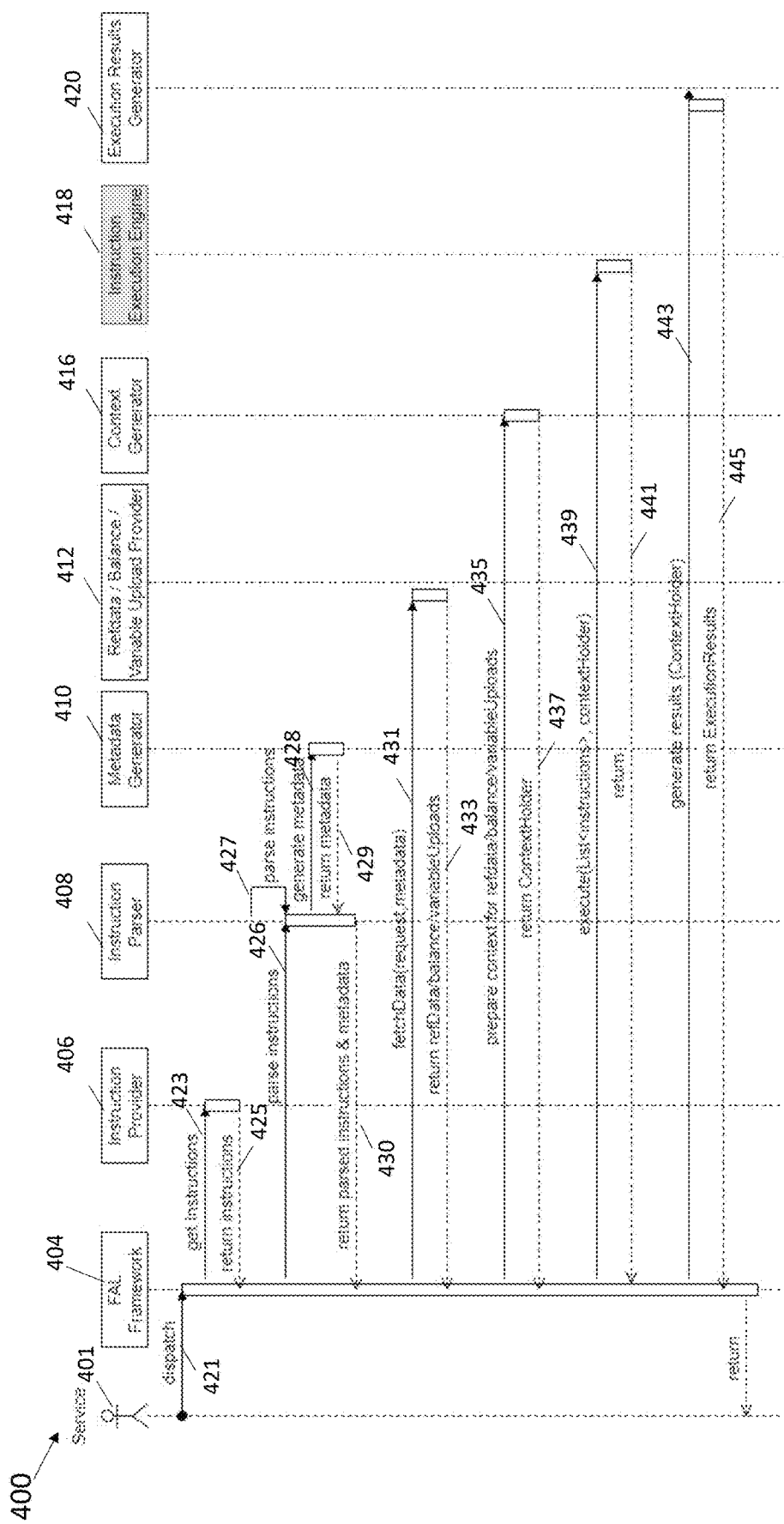
FIG. 4 is a sequence diagram of a method for modifying a system's execution logic, according to some embodiments of the invention.

FIG. 4 is a sequence diagram 400 of a method for modifying a system's execution logic, according to some embodiments of the invention. Specifically, FIG. 4 shows the execution flow from the execution service to FAL framework to providers, execution engine and back to the execution service, according to some embodiments of the invention.

The user 401 dispatches 421 a request for execution of an instruction. The request can include a unique identifier (e.g., EntityID, Type, Group and/or Effective Date). The dispatch 421 can be transmitted to the Fund Accounting Language (FAL) framework 404 (e.g., the system architecture 100 as described above in FIG. 1). Upon entering the FAL framework 404 the unique identifier can be used by the instruction provider 406 (e.g., instruction provider 116, as described above in FIG. 1) to get one or more instructions 423, and return the one or more instructions 425. The instruction parser 408 (e.g., instruction parser 118 as described above in FIG. 1) can receive a request to parse the one or more instructions 426 and parse the one or more instructions 427. The instruction parser 408 can transmit a generate metadata request 428 to the metadata generator 410 (e.g., metadata generator 120 as described above in FIG. 1). The metadata generator 410 can return the metadata 429 to the instruction parser 408. The instruction parser 408 can return the parsed one or more instructions and the metadata 430 to the FAL framework 404. The FAL framework can transmit a request to fetch data along with the metadata 431 to obtain reference data, balance data and/or variable upload, to the data providers 412 (e.g., data providers 122, 124, 126, 128 and/or 132 as described above in FIG. 1). The data providers 412 can return the reference data, balance data and/or variable upload 433. A request to prepare context 435 along with the reference data, balance data and/or variable upload can be sent to the context generator 416 (e.g., context generator 136 as described above in FIG. 1). The context generator 416 can return the context 437. A request 439 to execute the one or more instructions can be sent with the one or more instructions and the context to the instruction execution engine 418 (e.g., instruction execution engine 138 as described above in FIG. 1). The results can be returned 441. A generate results request 443 with the context can be transmitted to the execution results generator 420 (e.g., execution result generator 142 as described above in FIG. 1) and the execution results returned 445.

Figure 5:
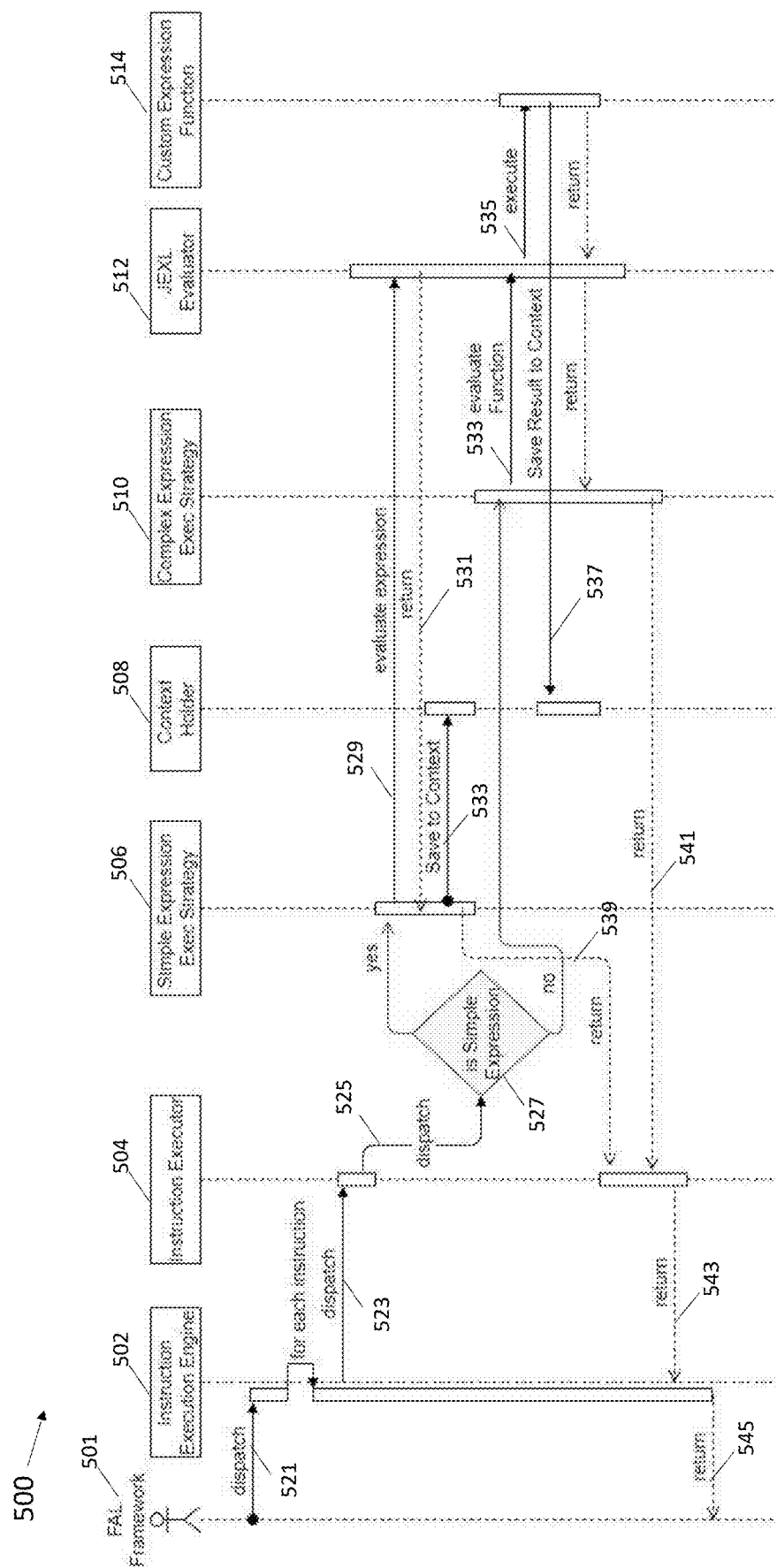
FIG. 5 is a sequence diagram of a method for modifying a system's execution logic, according to some embodiments of the invention.

FIG. 5 is a sequence diagram 500 of a method for modifying a system's execution logic, according to some embodiments of the invention. Specifically, FIG. 5 shows the execution flow through the instruction execution engine once the instructions and context are loaded (e.g., at step 439 in FIG. 4), according to some embodiments of the invention.

A dispatch message 521 including a list of instructions and context can be transmitted to the instruction execution engine 502. The Instruction execution engine 502 transmit each instruction 523 from the list of instructions 521 to Instruction Executor 504. The instruction executor 504 transmits a dispatch message 525 each instruction to either a simple instruction execution path or a complex instruction execution path based on whether a particular instruction is simple or complex 527. An instruction can be simple if it is a mathematical expression that includes operators without functions. An instruction can be complex if it includes a function.

If the instruction is simple, then the instructions are dispatched to the simple expression executor 506, which transmits an evaluate expression message 529 with the instruction to the JEXL evaluator 512. The JEXL evaluator 512 returns result of the simple expression 531 to the simple expression executor 506. The simple instruction executor 506 transmits a save to context message 533 to store the result to the context holder 508.

If the instruction is complex, then the instructions are sent to the complex expression executor 510. The complex expression executor 510 can transmit an evaluate function message 533 to the JEXL evaluator 512, which then transmits an execute message 535 to the custom expression function evaluator 514. The custom expression function evaluator 514 transmits a save results to context message 537 to the context holder 508. The complex expression executor 510 and the simple expression executor 506 can mark completion 539,541 of the dispatch 525 to the instruction executor 504 as part of execution completion. The instruction executor 504 can mark completion 543 of the dispatch 523 to the instruction execution engine 502, which can then transmit next instruction 523 to Instruction Executor 504 for the evaluation. At the end, after all the instructions finish execution, the Instruction Execution Engine 502 can mark completion 545 of the dispatch 521 to the FAL framework 501. As all the data can be stored in the Context Holder 508, FAL Framework 501 can access it directly post completion of Instruction Execution Engine 502.

Figure 6:
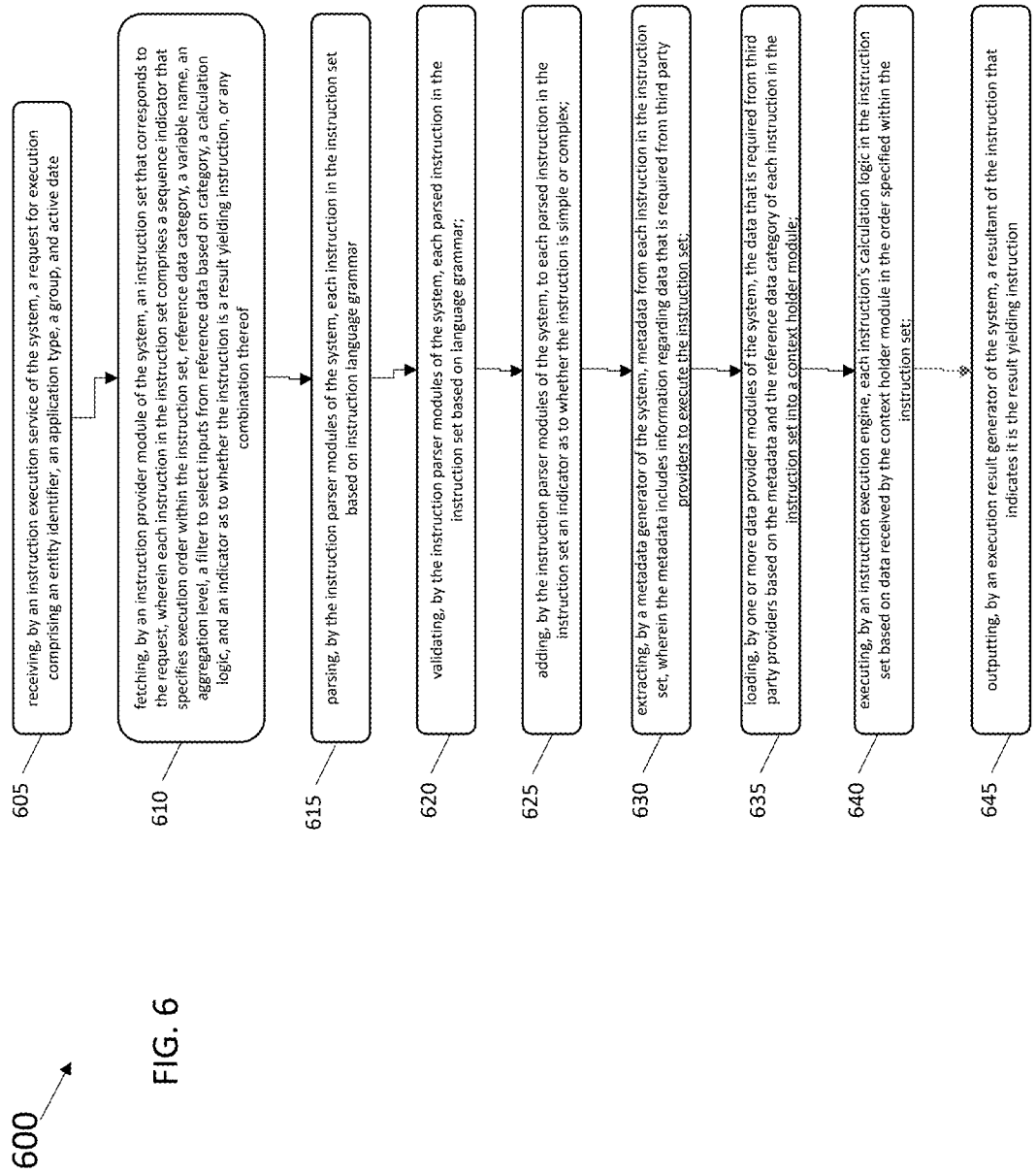
FIG. 6 is a flow chart of a method for modifying a system's execution logic, according to some embodiments of the invention.

FIG. 6 is a flow chart of a method 600 for modifying a system's execution logic, according to some embodiments of the invention.

The method can involve receiving, by an instruction execution service of the system (e.g., instruction execution service 114 as described above in FIG. 1), a request for execution comprising an entity identifier, an application type, a group, and active date (Step 605). The entity identifier, an application type, a group, and active date can form a unique identifier for stored instructions. In some embodiments the unique identifier is other fields of the instruction. The unique identifier can be based on the instruction format. The instruction format can be specified by a user, and/or predetermined. The instruction can include multiple fields.

The method can involve fetching, by an instruction provider module of the system (e.g., instruction provider 116 as described above in FIG. 1), an instruction set that corresponds to the request, wherein each instruction in the instruction set comprises a sequence indicator that specifies execution order within the instruction set, reference data category, a variable name, an aggregation level, a filter to select inputs from reference data based on category, a calculation logic, and an indicator as to whether the instruction is a result yielding instruction, or any combination thereof (Step 610). As is apparent to one of ordinary skill that for other instruction sets the fields can be different.

The method can involve parsing, by the instruction parser modules of the system (e.g., instruction parser 118 as described above in FIG. 1), each instruction in the instruction set based on instruction language grammar (Step 615).

The method can involve validating, by the instruction parser modules of the system, each parsed instruction in the instruction set based on language grammar (Step 620). For each instruction that is not validated then an exception can be raised and provided back to the caller.

The method can involve adding, by the instruction parser modules of the system, to each parsed instruction in the instruction set an indicator as to whether the instruction is simple or complex (Step 625). A determination of whether the parsed instruction is simple or complex can be based on whether the particular instruction's calculation logic is a function or an expression. If the particular instructions' calculation logic is a function then the particular parsed instruction is complex, otherwise its simple.

The method can involve extracting, by a metadata generator of the system (e.g., metadata generator 120 as described above in FIG. 1), metadata from each instruction in the instruction set, wherein the metadata includes information regarding data that is required from third party providers to execute the instruction set (Step 630).

The method can involve loading, by one or more data provider modules of the system (e.g., account reference data provider 126, order reference data provider 124, balance data provider 122, variable upload provider 128 and/or reference data override upload provider 132, as described above in FIG. 1), the data that is required from third party providers based on the metadata and the reference data category of each instruction in the instruction set into a context holder module (Step 635).

The method can involve executing, by an instruction execution engine (e.g., instruction execution engine 138 as described above in FIG. 1), each instruction's calculation logic in the instruction set based on data received by the context holder module in the order specified within the instruction set (Step 640).

The method can involve outputting, by an execution result generator of the system (e.g., execution result generator 142 as described above in FIG. 1), a resultant of the instruction that indicates it is the result yielding instruction (Step 645).

As described above, it can be possible for the data to have various contexts and structure. An expression value resolver can be used. The expression value resolver can be used to retrieve context specific values and resolve them.

For example, Table 19 as shown below show a variety of contexts.

| Context Name | Description | DataStructure |
|---|---|---|
| Input | Input context can contain all of (or substantial all of) the input arguments passed to the system through an Execution Request. The Execution Request can comprise the EntityId, Type, Group and Execution/effectiveDate. | Map<input, Map<input VariableName, input Variable Value>> e.g Map<input, Map<startDate, 2022 Jan. 1>> Map<input, Map<end Date, 2022 Jan. 31>> |

| Context Name | Description | DataStructure |
|---|---|---|
| | The request may contain additional params which may be needed for execution, hence Execution Request can access those params inside execution Any field inside of an Execution Request can be added to the context by annotating it with @InputContextVariable annotation. These input arguments can be available globally across all reference data and can be used in the instructions. | |
| Balances | Balances context can contain all the balances for each account per period. Since there can be more than one balance for a given account, and the value of each account can be different for each period, the storage structure of the balances context can involve an additional map (e.g., another dictionary). | Map<accountId, Map<period, Map<balanceName, balance Value>> e.g Map<Account1, Map<current, Map<TestBalance, 10>> |
| Result | Result context can contain all of the calculated result against each aggregation key. The Key can be generated through the Multilevel Aggregator (e.g., aggregator 206 as shown above in FIG. 2). All results of computations can be stored in a Result context. | Map<aggregationKey, Map<variableName, variableValue>> e.g Map<Account1, Map<V1, 2>> Map<Account2, Map <V1, 2>> |
| Override | Override contexts can contain all the user-defined overrides provided either through Variable Upload (e.g., variable upload provider 128) or Reference Data Override Upload (e.g., Reference Data Override Upload Provider 132). When retrieving any value from Context, the override context can be checked first to see if there are any overridden values provided and if found, then the overridden value can be returned instead of the calculated variable. Though the name suggests "Override", the context can also allow uploaded values that do not exists in any of the other contexts. | The data structure of override context is similar to that of Result context. Map<aggregationKey, Map<variableName, variable Value>> e.g Map<Account1, Map<V3, 20>> |
| Inter-mediate | Intermediate context can be a specialized type of Result context. This context may only store "intermediate variables" that may need to be captured while the computation is happening. These can provide further transparency into complex functions such as "prorate". | The data structure of Intermediate context is similar to that of Result context. Map<intermediateAggregationKey, Map<intermediate VariableName, variable Value>> |

| Context Name | Description | DataStructure |
|---|---|---|
| | Note: Unlike Result or Override context, values from intermediate variables, in some embodiments, cannot be used in calculations again. These can be one dimensional values where there are specialized access mechanisms to prevent actions such as get in normal value retrieval mechanisms. | |

Contexts can be highly specialized, both in terms of the underlying data structure and how the value can be retrieved from the data structure. A Value Resolver can be utilized to retrieve these context specific values by having context specific implementations. The Value Resolver can resolve values by first determining whether the value can be resolved. And if the value can be resolved then resolving the value.

Value Resolvers can be triggered when accessing a value for a variable.

There can be a plurality of value resolver types and there can be an order of precedence set between them in terms of execution order. The value resolver types can include balance value resolver, variable value resolver, bean property value resolver, and/or dynamic property value resolver. In some embodiments, the order of execution is first: balance value resolver, second: variable value resolver, third: bean property value resolver, fourth: dynamic property value resolver. In various embodiments, the order of execution is any available permutation of the possible order.

Figure 8:
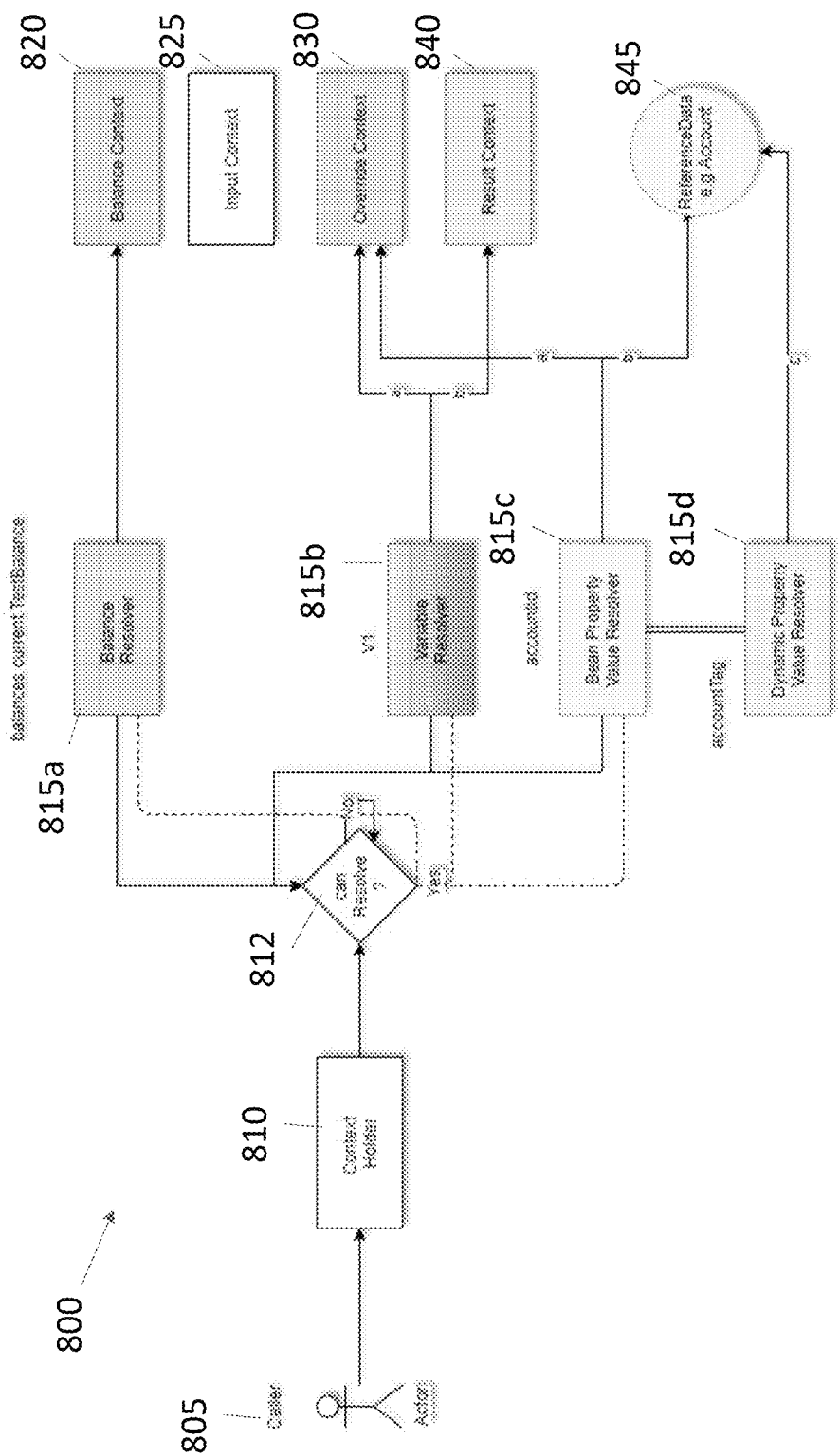
FIG. 8 is a value resolver architecture, according to some embodiments of the invention.

FIG. 8 is a value resolver architecture 800, according to some embodiments of the invention. The value resolver architecture 800 can include a caller 805, a context holder 810, a plurality of resolvers 815a, 815b, 815c, 815d, generally valuer resolvers 815, a balance context 820, an input context 825, an override context 830, a result context 840, and reference data 845.

During operation, generally, the data from the providers (e.g., account reference data provider 126, order reference data provider 124, and/or balance data provider 122, as described above in FIG. 1) can be loaded into context (e.g., reference data override context generator 130 and 134 from FIG. 1 Load all the data from the providers to put into override context.) Result context is the execution result from 138. Balance context is from the balance provider 122. Input context is whatever is received as part of the incoming request for execution of the instructions, not shown in FIG. 1.

ReferenceData (e.g., account) is the reference data provider. Doesn't go into the context, it is being utilized to get the values for the value resolvers.

During operation, a caller 805 (e.g., a JEXL Context 512 as part of Expression evaluator or a direct call by Filter 204, Expression Functions 208 or Aggregator 206) can make a call to access a value of a variable. The context holder 810 (e.g., context holder 136 as described above in FIG. 1), can abstract the plurality of value resolvers 815 into a single API that can, for example, allow for ease of interaction with multiple contexts.

In some embodiments, an instruction execution engine (e.g., instruction execution engine 138 as described above in FIG. 1) uses a JEXL evaluator for the expression evaluation. JEXL can require a mechanism to resolve the values for the tokens it extracts from the expression. The instruction execution engine can resolve values for tokens it extracts from expressions by tapping into JEXL context and providing the context holder output 810 to the JEXL context can resolve the values.

The context holder 810 can communicate with the plurality of value resolvers 815. Each of the plurality of value resolvers 815 can determine whether the value can be resolved 812 and if so, resolve the value.

The determination as to whether the value can be resolved can be based on a variable name and the reference data in which the value can be retrieved. The plurality of resolvers 815 can be looped through unit till a resolver is met that can resolve the value. The order of which revolver to check first, second, third, and fourth can be predetermined and/or input. The order can be, first: balance resolver, second: variable resolver, third: bean property value resolver, and fourth: dynamic property resolver.

The balance resolver 815a checks if the expression is a balance expression. If yes, then the balance resolver 815a "can resolve" returns true and the balance resolver 815a goes to the balance context 820 to retrieve the value. If the balance resolver 815a returns false, then the variable resolver 815b is checked.

The variable resolver 815b checks if the variable is a valid variable from instructions or part of the overrides. If yes, then the variable resolver 815b tries to resolve the value. The variable resolver 815b can query the result context 840 and the override context 830. The override context 830 includes values that override the variable value. If the value is missing from both the result context 840 and the override context 830, then there can be a possibility that the variable is a reference data property as the override context may have overrides for a few but not all entities for that property. The bean property value resolver 815c can be checked for the reference data property. The bean property value resolver 815c checks if the property is part of the reference data 845. If the property is part of the reference data 845, then the bean property value resolver 815c can resolve the value via the reference data 845, and the variable resolver is deemed to have resolved the variable.

If the variable resolver 815b does not resolve the variable, then the bean property value resolver 815c can attempt to resolve the value. If the bean property value resolver 815c does not resolve the value, then the dynamic property resolver 815d can be checked.

In some embodiments, the reference data may not have all the properties as part of standard reference data however the properties can be introduced later to be dynamic properties, attached to entities based on need basis.

In various embodiments, in the reference data, if a given variable name is neither a balance nor a variable, then it can be a static reference data property and can be retrieved from the reference data 845. In some embodiments, certain properties on the reference data may not be derived as static fields or methods. Therefore, it can be desirable for the FAL Framework to support dynamic properties that do not have any concrete method or fields defined inside the reference data object. For example, dynamic properties can be properties that are added by the system and/or third party.

For example, entity level property values (e.g., Account, Investor, Fund and Advisor) can be dynamic properties. A dynamic property resolver 815d can be checked to resolve the value. Dynamic properties can be checked for overriding.

For example, an account may have standard reference data such as accountId, accountOpenDate and/or accountCloseDate however a third party application may create application specific properties, e.g., accountTag, to tag an account under specific category. In this example, accountTag is not a standard reference data of account, it is dynamic app specific reference data and, in some embodiments, other apps may introduce such properties for any type of reference data. In some embodiments, a Dynamic Property Accessor can hold the dynamic property data. For e.g. if accountTag is being used in the instructions, then the Metadata provided to account reference data Provider can contain details of accountTag usage. As accountTag is not part of static properties of account, the account reference data provider can have additional logic to load the data from the data store and add it to the dynamic properties under account reference data which can be accessed using dynamic property accessor api.

If none of the plurality of resolvers 815 can resolve the value, then an exception can be issued.

Figure 9:
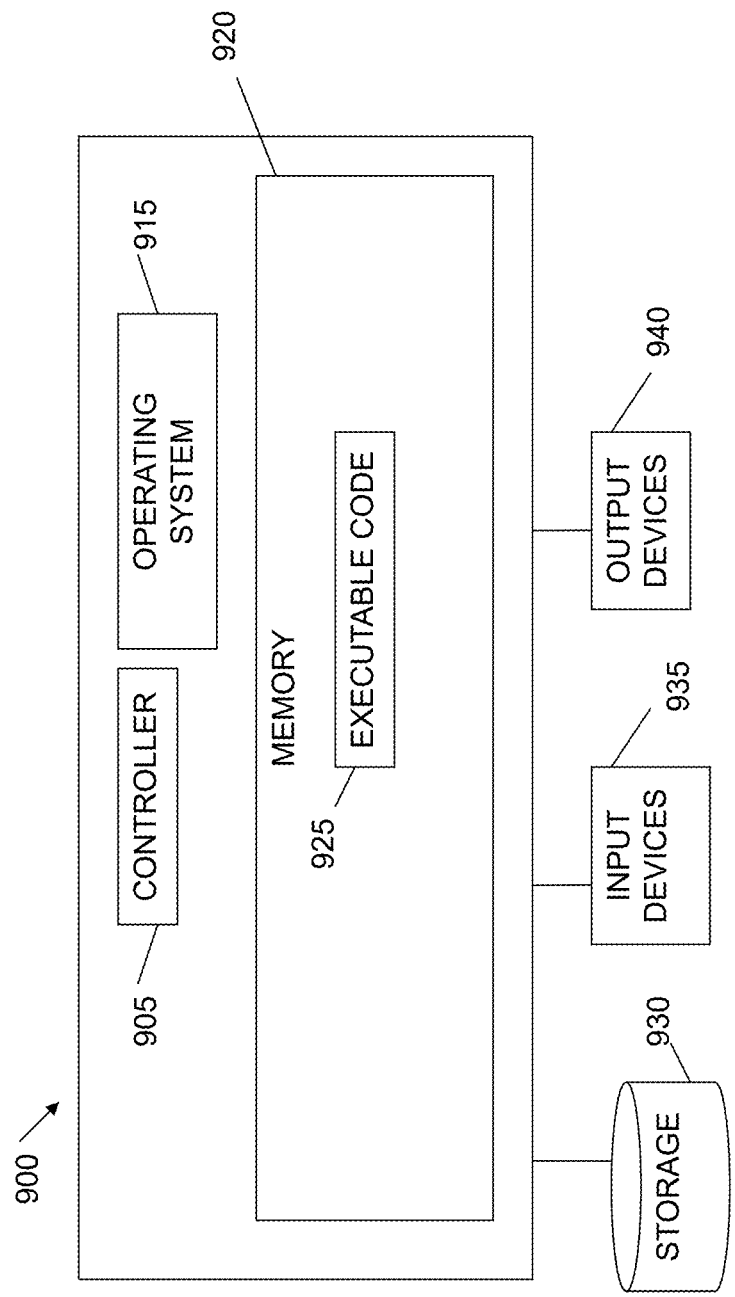
FIG. 9 shows a block diagram of a computing device which can be used with embodiments of the invention.

FIG. 9 shows a block diagram of a computing device 900 which can be used with embodiments of the invention. Computing device 900 can include a controller or processor 905 that can be or include, for example, one or more central processing unit processor(s) (CPU), one or more Graphics Processing Unit(s) (GPU or GPGPU), a chip or any suitable computing or computational device, an operating system 915, a memory 920, a storage 930, input devices 935 and output devices 940.

Operating system 915 can be or can include any code segment designed and/or configured to perform tasks involving coordination, scheduling, arbitration, supervising, controlling or otherwise managing operation of computing device 900, for example, scheduling execution of programs. Memory 920 can be or can include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 920 can be or can include a plurality of, possibly different memory units. Memory 920 can store for example, instructions to carry out a method (e.g., code 925), and/or data such as user responses, interruptions, etc.

Executable code 925 can be any executable code, e.g., an application, a program, a process, task or script. Executable code 925 can be executed by controller 905 possibly under control of operating system 915. For example, executable code 925 can when executed cause masking of personally identifiable information (PII), according to embodiments of the invention. In some embodiments, more than one computing device 900 or components of device 900 can be used for multiple functions described herein. For the various modules and functions described herein, one or more computing devices 900 or components of computing device 900 can be used. Devices that include components similar or different to those included in computing device 900 can be used, and can be connected to a network and used as a system. One or more processor(s) 905 can be configured to carry out embodiments of the invention by for example executing software or code. Storage 930 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 930 and can be loaded from storage 930 into a memory 920 where it can be processed by controller 905. In some embodiments, some of the components shown in FIG. 9 can be omitted.

Input devices 935 can be or can include for example a mouse, a keyboard, a touch screen or pad or any suitable input device. It will be recognized that any suitable number of input devices can be operatively connected to computing device 900 as shown by block 935. Output devices 940 can include one or more displays, speakers and/or any other suitable output devices. It will be recognized that any suitable number of output devices can be operatively connected to computing device 900 as shown by block 940. Any applicable input/output (I/O) devices can be connected to computing device 900, for example, a wired or wireless network interface card (NIC), a modem, printer or facsimile machine, a universal serial bus (USB) device or external hard drive can be included in input devices 935 and/or output devices 940.

Embodiments of the invention can include one or more article(s) (e.g. memory 920 or storage 930) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In various embodiments, the system is implemented one or more virtual machines. The system (e.g., system of FIG. 1, FIG. 2, and/or FIG. 8 as described above) and methods (e.g., the methods as described in FIG. 3, FIG. 4, FIG. 5 and FIG. 6 as described above), can be implemented on any combination of virtual machines. The virtual machines can be implemented on a computing device as described above in FIG. 9, or any computing device as is known in the art that is suitable for allowing implementation of virtual machines.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A method for modifying a system's execution logic without changing the code, the method comprising:
  receiving, by an instruction execution service of the system, a request for execution comprising an entity identifier, an application type, a group, and active date;
  fetching, by an instruction provider module of the system, an instruction set that corresponds to the request, wherein each instruction in the instruction set comprises a sequence indicator that specifies execution order within the instruction set, reference data category, a variable name, an aggregation level, a filter to select inputs from reference data based on category, a calculation logic, and an indicator as to whether the instruction is a result yielding instruction, or any combination thereof;

parsing, by the instruction parser modules of the system, each instruction in the instruction set based on instruction language grammar;

validating, by the instruction parser modules of the system, each parsed instruction in the instruction set based on language grammar;

adding, by the instruction parser modules of the system, to each parsed instruction in the instruction set an indicator as to whether the instruction is simple or complex;

extracting, by a metadata generator of the system, metadata from each instruction in the instruction set, wherein the metadata includes information regarding data that is required from third party providers to execute the instruction set;

loading, by one or more data provider modules of the system, the data that is required from third party providers based on the metadata and the reference data category of each instruction in the instruction set into a context holder module;

executing, by an instruction execution engine, each instruction's calculation logic in the instruction set based on data received by the context holder module in the order specified within the instruction set; and outputting, by an execution result generator of the system, a resultant of the instruction that indicates it is the result yielding instruction.

2. The method of claim 1 wherein the instruction execution engine does not retrieve data from any entity.

3. The method of claim 1 wherein if the instruction is complex, executing the particular instruction's calculation logic further comprises retrieving one or more functions from a function repository corresponding to the calculation logic.

4. The method of claim 1 wherein the one or more data provider modules are an account reference data provider, an order reference data provider, a balance provider or any combination thereof.

5. The method of claim 1 wherein the entity identifier is the identity of the entity requiring execution of the instruction.

6. The method of claim 1 wherein executing an instruction involves filtering the input data, evaluating the calculation logic, aggregating results and storing them back in the Context holder.

7. The method of claim 1 wherein executing an instruction involves resolving one or more value.

8. The method of claim 1 wherein a complex instruction includes a function.

9. A non-transitory computer readable storage medium storing a set of instructions for modifying a system's execution logic without changing the code, by performing the operations of:

receiving a request for execution comprising an entity identifier, an application type, a group, and active date;

fetching an instruction set that corresponds to the request, wherein each instruction in the instruction set comprises a sequence indicator that specifies execution order within the instruction set, reference data category, a variable name, an aggregation level, a filter to select inputs from reference data based on category, a calculation logic, and an indicator as to whether the instruction is a result yielding instruction, or any combination thereof;

parsing each instruction in the instruction set based on instruction language grammar;

validating each parsed instruction in the instruction set based on language grammar;

adding to each parsed instruction in the instruction set an indicator as to whether the instruction is simple or complex;

extracting metadata from each instruction in the instruction set, wherein the metadata includes information regarding data that is required from third party providers to execute the instruction set;

loading the data that is required from third party providers based on the metadata and the reference data category of each instruction in the instruction set into a context holder module;

executing each instruction's calculation logic in the instruction set based on data received by the context holder module in the order specified within the instruction set; and outputting a resultant of the instruction that indicates it is the result yielding instruction.

10. The non-transitory computer readable storage medium of claim 9 wherein the instruction execution engine does not retrieve data from any entity.

11. The non-transitory computer readable storage medium of claim 9 wherein if the instruction is complex, executing the particular instruction's calculation logic further comprises retrieving one or more functions from a function repository corresponding to the calculation logic.

12. The non-transitory computer readable storage medium of claim 9 wherein the one or more data provider modules are an account reference data provider, an order reference data provider, a balance provider or any combination thereof.

13. The non-transitory computer readable storage medium of claim 9 wherein the entity identifier is the identity of the entity requiring execution of the instruction.

14. The non-transitory computer readable storage medium of claim 9 wherein executing an instruction involves filtering the input data, evaluating the calculation logic, aggregating results and storing them back in the Context holder.

15. The non-transitory computer readable storage medium of claim 9 wherein executing an instruction involves resolving one or more value.

16. The non-transitory computer readable storage medium of claim 9 wherein a complex instruction includes a function.

* * * * *